US 8,700,042 B2

(12) United States Patent
Nagaraj et al.

(10) Patent No.: US 8,700,042 B2
(45) Date of Patent: Apr. 15, 2014

(54) METHOD TO CONTROL THE EFFECTS OF OUT-OF-CELL INTERFERENCE IN A WIRELESS CELLULAR SYSTEM USING BACKHAUL TRANSMISSION OF DECODED DATA AND FORMATS

(75) Inventors: Shirish Nagaraj, Cedar Knolls, NJ (US); Subramanian Vasudevan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 729 days.

(21) Appl. No.: 11/409,162

(22) Filed: Apr. 21, 2006

(65) Prior Publication Data
US 2007/0248052 A1 Oct. 25, 2007

(51) Int. Cl.
*H04W 36/30* (2009.01)

(52) U.S. Cl.
USPC ........... 455/439; 714/749; 455/436; 455/443; 455/445

(58) Field of Classification Search
USPC .................. 455/439, 436, 443, 445; 714/749
See application file for complete search history.

(56) References Cited

U.S. PATENT DOCUMENTS

| | | | | |
|---|---|---|---|---|
| 5,504,773 A | * | 4/1996 | Padovani et al. ............... | 375/130 |
| 5,638,412 A | * | 6/1997 | Blakeney et al. .............. | 375/377 |
| 5,684,791 A | * | 11/1997 | Raychaudhuri et al. ... | 370/310.2 |
| 5,845,211 A | * | 12/1998 | Roach, Jr. ....................... | 455/436 |
| 5,862,124 A | | 1/1999 | Hottinen | |
| 5,894,500 A | | 4/1999 | Bruckert | |
| 5,914,950 A | * | 6/1999 | Tiedemann et al. ........... | 370/348 |
| 5,956,644 A | * | 9/1999 | Miller et al. ................... | 455/453 |
| 5,966,384 A | * | 10/1999 | Felix et al. ...................... | 370/465 |
| 6,058,106 A | * | 5/2000 | Cudak et al. .................... | 370/313 |
| 6,094,426 A | * | 7/2000 | Honkasalo et al. ............ | 370/331 |
| 6,404,760 B1 | * | 6/2002 | Holtzman et al. ............. | 370/342 |
| 6,405,052 B1 | * | 6/2002 | Faber .............................. | 455/522 |
| 6,434,367 B1 | * | 8/2002 | Kumar et al. ................... | 455/70 |
| 6,438,723 B1 | * | 8/2002 | Kalliojarvi ..................... | 714/751 |

(Continued)

FOREIGN PATENT DOCUMENTS

| | | | | |
|---|---|---|---|---|
| EP | 1 564 908 | | 8/2005 | ............... H04B 7/08 |
| WO | 2007027733 A3 | | 3/2007 | |

(Continued)

OTHER PUBLICATIONS

Woon-Young Yeo et al, "A Markovian approach for modeling IS-856 reverse link rate control", IEEE Communications Society, 2004 IEEE International Conference on Paris, France, Jun. 20, 2004, pp. 3236-3240.

(Continued)

*Primary Examiner* — Lester Kincaid
*Assistant Examiner* — Diego Herrera
(74) *Attorney, Agent, or Firm* — C. R. Narcisse

(57) ABSTRACT

Successfully decoded data received from a mobile terminal as well as the transmission format of that data is relayed over the backhaul from a base station receiver that successfully decoded the mobile terminal's transmission to the base stations in the mobile terminal's active set that presumably were unable to decode the mobile terminal's transmission due to inadequate signal-to-noise ratio. A base station that receives this transmission from the relaying base station that did'successfully decode and demodulate the mobile terminal's transmission is then able to reconstruct the data and subtract it from the total interference, thereby increasing the signal-to-noise ratio at this base station for its in-cell processing.

11 Claims, 4 Drawing Sheets

(56) References Cited

U.S. PATENT DOCUMENTS

| | | | |
|---|---|---|---|
| 6,463,294 B1* | 10/2002 | Holma et al. | 455/513 |
| 6,470,001 B1* | 10/2002 | Kim et al. | 370/342 |
| 6,507,572 B1* | 1/2003 | Kumar et al. | 370/335 |
| 6,519,456 B2* | 2/2003 | Antonio et al. | 455/442 |
| 6,535,497 B1 | 3/2003 | Raith | 370/336 |
| 6,567,420 B1* | 5/2003 | Tiedemann et al. | 370/468 |
| 6,690,938 B1* | 2/2004 | Chin | 455/450 |
| 6,711,208 B2* | 3/2004 | Razoumov et al. | 375/224 |
| 6,757,270 B1* | 6/2004 | Kumar et al. | 370/342 |
| 6,768,727 B1* | 7/2004 | Sourour et al. | 370/335 |
| 6,973,308 B1* | 12/2005 | Smith | 455/436 |
| 7,020,115 B2* | 3/2006 | Chillariga et al. | 370/337 |
| 7,047,009 B2* | 5/2006 | Laroia et al. | 455/437 |
| 7,065,359 B2* | 6/2006 | Chuah et al. | 455/436 |
| 7,154,846 B2* | 12/2006 | Chen et al. | 370/209 |
| 2002/0089947 A1* | 7/2002 | Holtzman et al. | 370/328 |
| 2002/0128013 A1* | 9/2002 | Declerck et al. | 455/436 |
| 2002/0150040 A1* | 10/2002 | Tong et al. | 370/216 |
| 2002/0154610 A1* | 10/2002 | Tiedemann et al. | 370/329 |
| 2003/0003906 A1* | 1/2003 | Demers et al. | 455/424 |
| 2003/0067896 A1* | 4/2003 | Chuah et al. | 370/331 |
| 2003/0125040 A1 | 7/2003 | Walton et al. | 455/454 |
| 2004/0047326 A1* | 3/2004 | Chiu | 370/342 |
| 2004/0137930 A1* | 7/2004 | Kim et al. | 455/517 |
| 2004/0162075 A1* | 8/2004 | Malladi et al. | 455/442 |
| 2004/0162083 A1* | 8/2004 | Chen et al. | 455/454 |
| 2004/0192208 A1 | 9/2004 | Kong et al. | 455/63.1 |
| 2004/0192308 A1* | 9/2004 | Lee et al. | 455/436 |
| 2005/0111405 A1 | 5/2005 | Kanterakis | 370/328 |
| 2005/0130663 A1* | 6/2005 | Hong et al. | 455/445 |
| 2006/0084389 A1* | 4/2006 | Beale et al. | 455/67.11 |
| 2006/0135163 A1* | 6/2006 | Obuchi et al. | 455/436 |
| 2006/0264220 A1* | 11/2006 | Chen et al. | 455/454 |
| 2007/0047495 A1 | 3/2007 | Ji | |
| 2008/0254804 A1* | 10/2008 | Lohr et al. | 455/442 |
| 2009/0238148 A1* | 9/2009 | Englund et al. | 370/335 |
| 2011/0223924 A1* | 9/2011 | Lohr et al. | 455/450 |

FOREIGN PATENT DOCUMENTS

| | | | |
|---|---|---|---|
| WO | WO 2007/024963 A2 | 3/2007 | |
| WO | WO 2007/024963 A3 | 3/2007 | H04Q 7/38 |
| WO | PCT/US2007/009329 | 10/2007 | |

OTHER PUBLICATIONS

Peter Benko et al, "A Large-scale, Passive Analysis of End-to-End TCP Performance over GPRS", INFOCOM 2004, 23$^{rd}$ Annual Joint Conference of the IEEE Computer and Communcations Societies, Hong Kong, PR China 7-11, vol. 3, Mar. 7, 2004, pp. 1882-1892.

* cited by examiner

METHOD TO CONTROL THE EFFECTS OF OUT-OF-CELL INTERFERENCE IN A WIRELESS CELLULAR SYSTEM USING BACKHAUL TRANSMISSION OF DECODED DATA AND FORMATS

TECHNICAL FIELD

This invention relates to wireless communications.

BACKGROUND OF THE INVENTION

In a wireless system, mobile terminals transmit and receive data over bi-directional wireless links from one or more base stations. The mobile terminal-transmit direction is known as the uplink and the mobile terminal-receive direction is known as the downlink. The set of base stations with which a mobile terminal is communicating is known as the active set of base stations for that mobile terminal, or that mobile terminal's active set. During normal conditions when a mobile terminal is within a base station's coverage area, the active set for that mobile terminal would generally be a single base station so that the active set includes only that one base station, which is that mobile terminal's serving station. When a mobile terminal, however, is within the range of multiple base stations and as such is in a handoff state, the active set includes the multiple base stations, which are each monitoring the signal from that mobile terminal and decoding it when able to do so. Only one of the base stations, however, is the serving base station for that mobile terminal and the other base stations are non-serving base stations. FIG. 1 shows three base stations (BSs) 101, 102 and 103 and their respective cell coverage areas 104, 105 and 106. Mobile terminal 107 is shown within the coverage area 104 of base station 101, which is its serving base station. Non-serving base stations 102 and 103, however, in addition to serving base station 101 constitute the active set for mobile terminal 107.

In a data system, on the downlink, the mobile terminal 107 receives data from only one base station but has the option of reselecting the serving base station in order to receive data from any other base station in its active set depending on from which base station the mobile terminal receives a signal with the highest signal-to-noise ratio. On the uplink, the serving and the non-serving base stations each attempts to demodulate and decode transmissions from the mobile terminal.

The capacity of a wireless system refers either to the number of mobile terminals that can simultaneously transmit or receive data, or the aggregate date rate of these mobile terminals, either expressed in mobile terminals/sector, erlangs/sector or data throughput/sector. The uplink capacity of the system can be different from its downlink capacity. For symmetric services, such as voice, (i.e., required throughput/data rate for a mobile terminal on the uplink is equal to that on the downlink), the overall system capacity is limited by the lower of uplink and downlink capacity. In current wireless systems specified by standards such as CDMA2000 1x, EV-DO Rev 0 and Rev A, HSDPA/EDCH, and WiMAX, the uplink has a substantially lower capacity than the downlink. This imbalance needs to be remedied for full use of downlink capacity and to maximize the number of mobile terminals than can operate symmetric services on the system.

In wireless systems that are based on direct spread or multi-carrier (optionally with precoding) CDMA, a plurality of mobile terminals within a sector (and across sectors) re-use a spreading sequence or a set of frequency tones to communicate with their respective active sets, while being differentiated by mobile terminal-specific codes. A mechanism for increasing uplink sector capacity is to perform successive interference cancellation on these transmissions at the base station transceiver. FIG. 2 illustrates base station noise rise components. As shown, at a base station receiver 200, the total rise over thermal noise in a sector consists of the composite signal 201 from the mobile terminals within that sector for which that base station is the serving base station, and the out-of-cell interference 202 caused by mobile terminals transmitting in adjacent sectors. The latter includes interference from those mobile terminals in the adjacent sectors for which base station receiver 200 is within these mobile terminals' active set but for which base station 200 is non-serving, plus the interference caused by other transmitting mobile terminals in other sectors that do not include base station 200 within each such mobile terminal's active set.

An illustrative method of interference cancellation is disclosed in co-pending patent application Ser. No. 10/401,594 filed Mar. 31, 2003, and published as United States Patent Application Publication No. US2004/0192208 A1 on Sep. 30, 2004. Using such an interference cancellation method, if the decoding of any mobile terminal is successful, its signal is reconstructed and subtracted from the composite received signal at the base station. FIG. 3 shows a successive interference cancellation scheme at an exemplary base station receiver 300 that is the serving base station for four mobile terminals 301, 302, 303 and 304 within a sector of that base station receiver 300. The received power at base station receiver 300 from mobile terminals 301, 302, 303, and 304 is respectively $P\_1, P\_2, P\_3$, and $P\_4$. In addition, base station receiver 300 receives a composite signal power as the result of out-of-cell interference (IOC) caused by transmissions from mobile terminals out of the sector. When a particular transmission from a mobile terminal from within the sector is successfully decoded by the base station receiver, the transmission is reconstructed and subtracted from the composite signal at the base station, after which another received signal is demodulated, decoded, reconstructed and subtracted from the remaining composite signal. This process is repeated for each of the remaining signals. Advantageously, the signals from the mobile terminals that are decoded later in the demodulation and decoding process do not "see" the interference from transmissions from the mobile terminals that were decoded earlier in the sequence. FIG. 3 shows a successive calculation of the signal-to-noise ratios ($Snr\_1$-$Snr\_4$) of the four mobile terminals 301-304, respectively. Starting with mobile terminal 301, $Snr\_1$ is calculated as $P\_1/(P\_2+P\_3+P\_4+IOC+N)$, where N is the measurable thermal noise. The contribution from each is successively subtracted off from the received composite signal at the base station receiver, so that, for the last mobile terminal 304, $Snr\_4$ is calculated as $P\_4/(IOC+N)$. Since the mobile terminals that are decoded later see a higher signal-to-noise ratio, they are capable of supporting either a higher rate of transmission and/or increased reliability.

In the above-described scenario, it is not possible for the base station receiver to successfully decode the transmissions of all the mobile terminals that have this base station sector in their active set. As a result, most of the out-of-cell interference received by a base station receiver cannot be deducted. Thus, as noted above, the signal-to-noise ratio for station 304 is still limited by this out-of-cell interference IOC.

Typically, the power control rule followed by mobile terminals is to either (i) follow power control commands from the serving sector in its active set, or (ii) follow a rule known as the or-of-the downs, whereby the mobile terminal lowers its power if any of the base stations in the active set instructs it to do so via a down power control command. While an or-of-the-downs power control ensures successful reception of the mobile terminal's transmission at at least one base station (presumably the one with the best uplink connection from the mobile terminal), it also ensures that the mobile terminal's transmission is not received with adequate signal-to-noise ratio to be successfully decodable at all of the base stations in the active set. Thus, this undecodable interference limits the capacity gain from a system employing successive interference cancellation. Even as mobile terminals within a sector transmit with ever increasing powers, in order to increase their signal-to-noise ratios at the base station receiver (and hence achieve higher data rates), their interference to adjacent sectors grows proportionately, thereby limiting the rates that can be achieved by mobile terminals in those sectors. In turn, the interference from the mobile terminals in adjacent sectors marginalizes the gains for the mobile terminals with the sector under consideration that increased their power in the first place.

A methodology is thus desired that enables a base station receiver to reconstruct and subtract the out-of-cell interference from the composite received signal so that the signal-to-noise ratio can be improved for all in-sector mobile terminals.

SUMMARY OF THE INVENTION

In an embodiment of the invention, successfully decoded data received from a mobile terminal as well as the transmission format of that data (e.g., the modulation and coding scheme used by the mobile terminal to transmit that data and the number of transmissions that were needed to achieve a successful decoding) is relayed over the backhaul (i.e., a link between base stations or between base stations and a central network entity such as a base station controller, a radio network controller, or a mobile switching center) from the base station receiver in the sector that successfully decoded the mobile terminal's transmission to the base stations in the active set that presumably were unable to decode this mobile terminal's transmission due to inadequate signal-to-noise ratio. A base station that receives this transmission from the relaying base station that did successfully decode and demodulate the mobile terminal's transmission can then reconstruct the data and subtract it from the total interference at that base station, thereby increasing the signal-to-noise ratio at this base station for its in-cell processing. The premise is that those sectors receiving such a transmission over the backhaul from a base station that was able to decode the data have been able to at least track the pilot signal of that mobile terminal. Using the decoded data and information about the coding or modulation scheme that are received over the backhaul, the channel (i.e., the multipath profile in the time domain or frequency domain channel response) is re-estimated and the waveform received from the mobile terminal is reconstructed and subtracted from the total interference at the base station. As a result, transmissions from other mobile terminals, which have yet to be successfully decoded at that base station, will experience a higher signal-to-noise ratio and thus an increased likelihood of being successfully decoded.

The methodology can be used in any system where out-of-cell interference limits the signal-to-noise ratio for one or more in-cell mobile terminals such as the system described above that uses successive interference cancellation or an OFDMA system that allows only one in-cell transmission over a given set of frequency tones.

BRIEF DESCRIPTION OF THE DRAWING

The present invention will be better understood from reading the following description of non-limiting embodiments, with reference to the attached drawings, wherein below.

DETAILED DESCRIPTION

Figure 1:
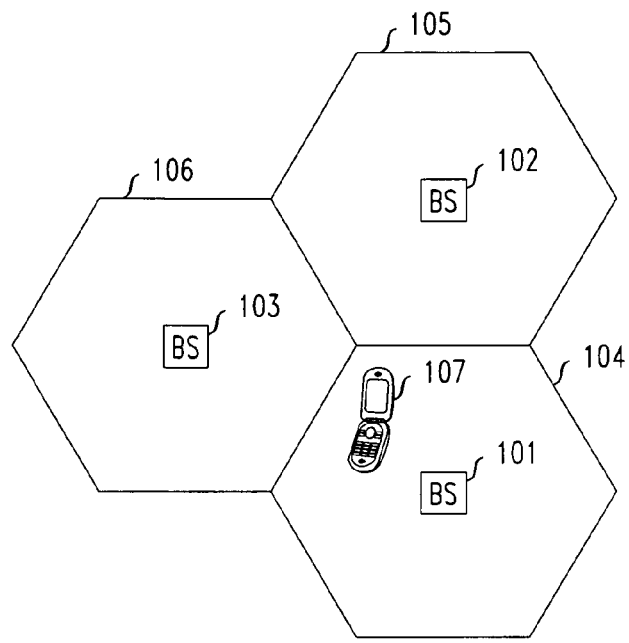
FIG. 1 shows a prior art arrangement of a mobile terminal and the serving base station and non-serving base stations in its active set.
Figure 2:
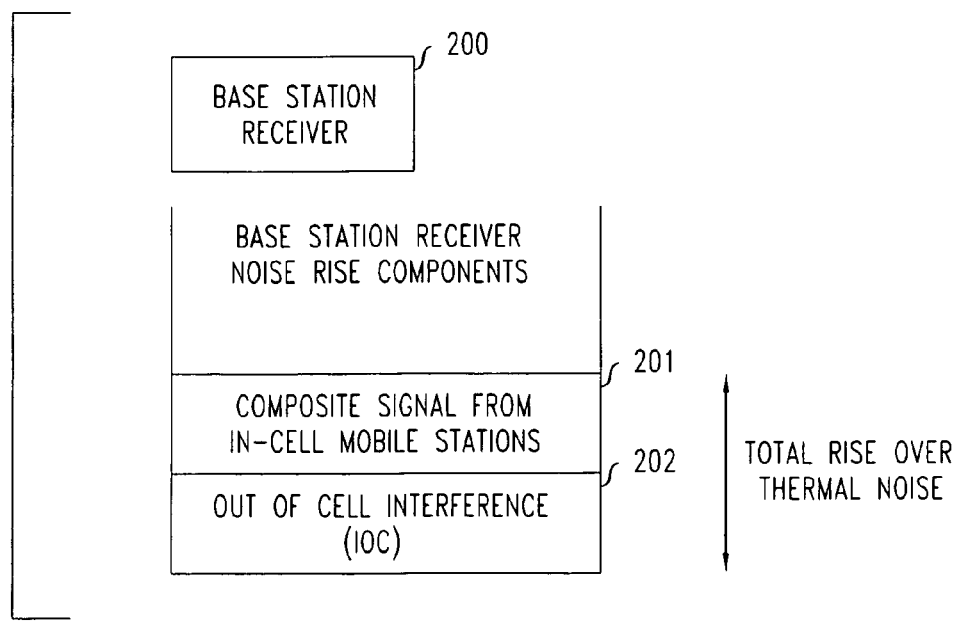
FIG. 2 illustrates base station noise rise components.
Figure 3:
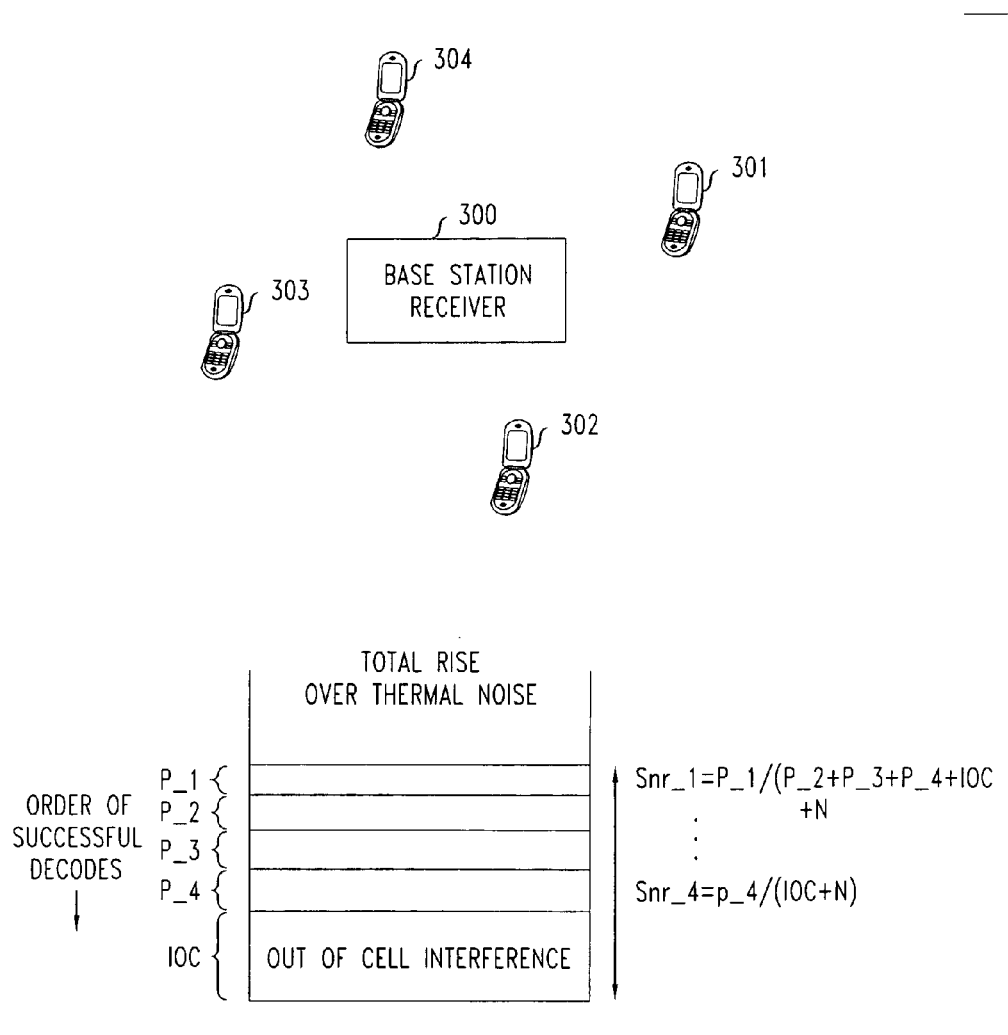
FIG. 3 shows a prior art successive interference cancellation scheme at an exemplary base station receiver that is the serving base station for four mobile terminals within a sector of that base station receiver.
Figure 4:
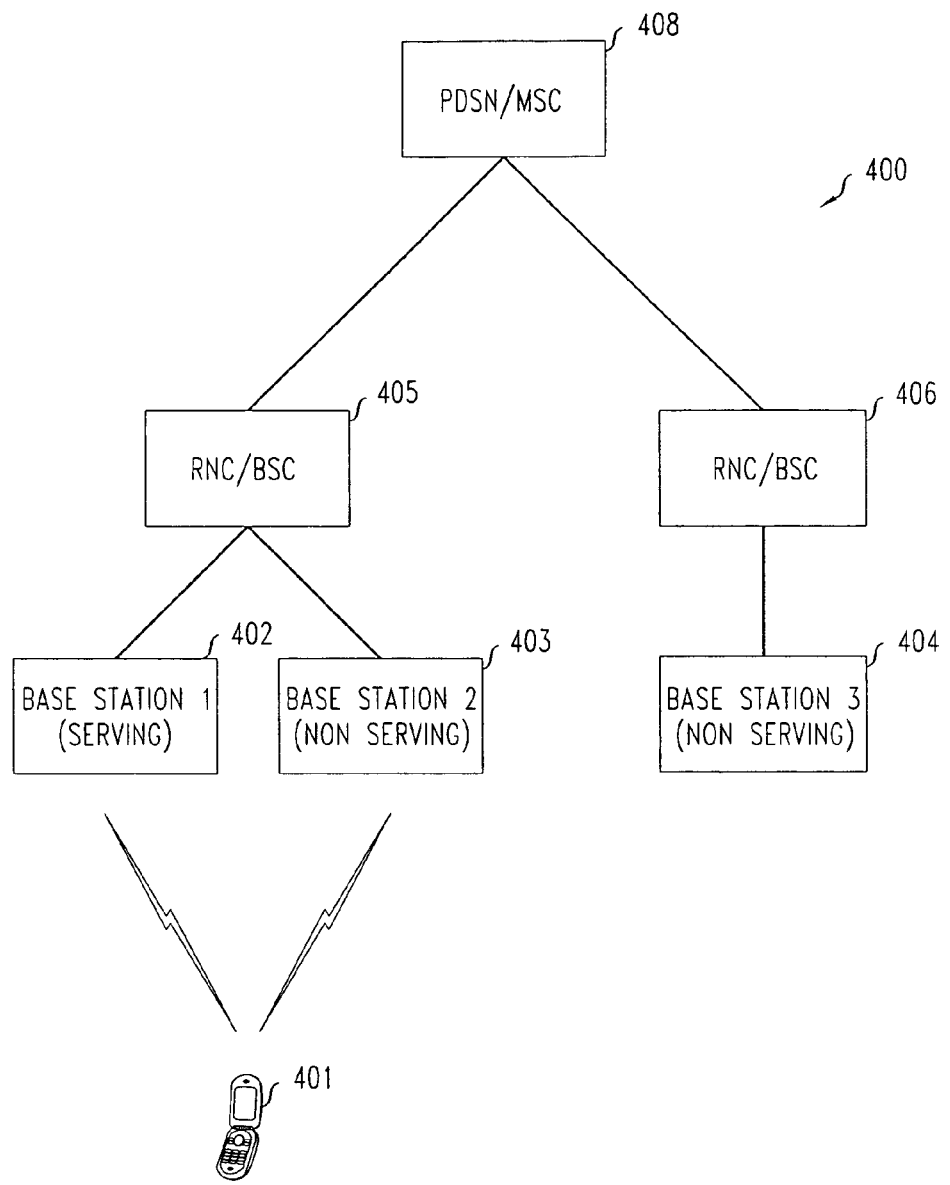
FIG. 4 show an arrangement in accordance with an embodiment of the present invention in which a base station sends information over the backhaul to other base stations in a mobile terminal's active set.

FIG. 4 shows a wireless communications system 400 in which the active set for a mobile terminal 401 includes base stations 402, 403 and 404. Base station 402 is the serving base station and base stations 403 and 404 are non-serving base stations. For illustrative purposes, serving base station 402 and non-serving base station 403 are connected to the same Radio Network Controller (RNC)/Base Station Controller (BSC) 405 and non-serving base station 404 is connected to RNC/BSC 406. RNC/BSC 405 and RNC/BSC 406 are connected to a common Packet Data Switching Node (PDSN)/Mobile Switching Center (MSC) 408.

In an embodiment of the present invention, when data that has been transmitted by mobile terminal 401 is successfully decoded by serving base station 402, that decoded data and the transmission format of that successfully decoded data is sent over the backhaul to the non-serving base stations 403 and 404 in the active set of mobile terminal 401. Specifically, the modulation and coding format, and the number of transmissions of the data that were required to achieve a successful decoding of that data are sent with the decoded data to these base stations. The decoded data and this information is sent by serving base station 402 to non-serving base station 403 through RNC/BSC 405, and is sent to base station 404 through RNC/BSC 405, PDSN/MSC 408, and RNC/BSC 406. If the functions of RNC/BSC 405 are collapsed into base stations 402 and 403, then base station 402 could send the information directly to base station 403.

Figure 5:
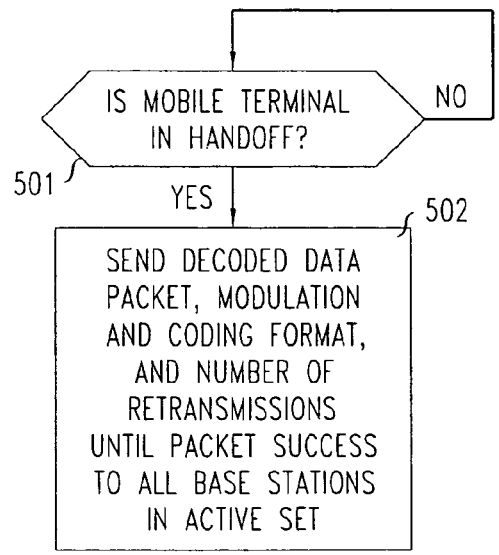
FIG. 5 is a flowchart showing the steps at a serving base station in accordance with an embodiment of the present invention.

FIG. 5 shows the steps performed at a serving base station, such as base station 402 in FIG. 4. At step 501 a determination is made whether the mobile terminal with which the base station is communicating is in a handoff state. Thus, if the active set of that mobile terminal is only that base station, the mobile terminal is not in a handoff state. If the active set is greater than one, then the mobile terminal is in handoff and other base stations in that active set are receiving and attempting to decode transmissions from that mobile terminal. If in handoff, then at step 502, the serving base station sends the decoded data packet and transmission format to all base stations in that mobile terminal's active set over the backhaul.

Figure 6:
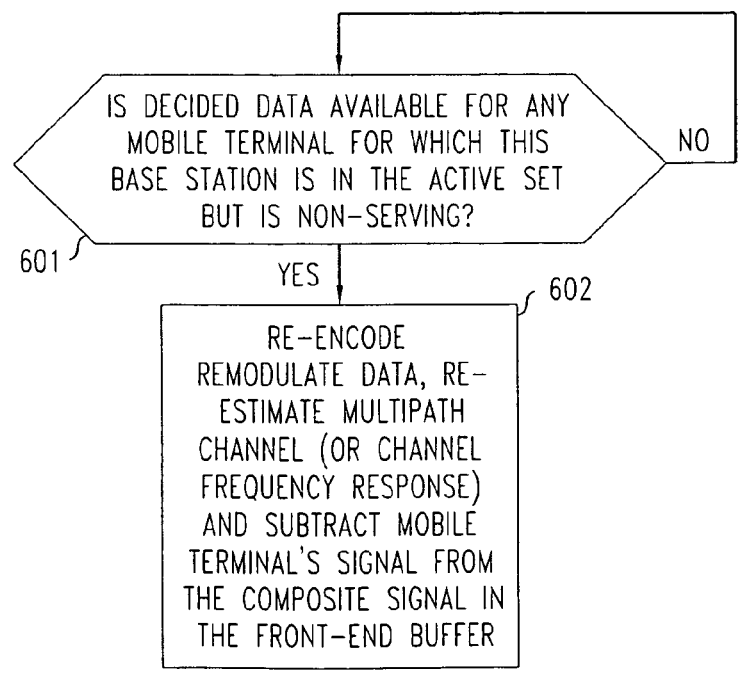
FIG. 6 is a flowchart showing the-steps at a non-serving base station in accordance with an embodiment of the present invention.

FIG. 6 shows the steps performed at a non-serving base station, such as base stations 403 and 404 in FIG. 4. At step 601 a determination is made whether the decoded data and transmission format received on the backhaul from another base station had been sent from a mobile terminal for which this base station is in the active set but for which this base station is non-serving. If it has, at step 602, the decoded data received on the backhaul from the serving base station is re-encoded, and re-modulated and the multipath channel (or channel frequency response) are estimated. The signal from the mobile terminal is then subtracted from that mobile terminal's composite signal that is received at this non-serving base station and is stored in the non-serving base station's front end buffer. By so removing this out-of-cell interference at this non-serving base station, the signal-to-noise ratio at this base station for its in-cell processing is increased. More specifically, transmissions from other mobile terminals that have yet to be successfully decoded at this base station will experience a higher signal-to-noise ratio and thus an increased likelihood of being successfully decoded.

Although it has been assumed in the description above that it was the serving base station that successfully decoded a data transmission from the mobile terminal and relayed the decoded data and transmission format to the other non-serving base stations in the mobile terminal's active set, it should also be realized that at any given instant the serving base station may not have successfully decoded a mobile terminal's data transmission and one of the non-serving base stations in the active set may have in fact successfully decoded that transmission. In this case, it would be this non-serving base station, which successfully decoded that transmission that relays the decoded data and its transmission format to the other base stations in the active set, including the serving base station.

As previously discussed, the described methodology can be-used in any system where out-of-cell interference limits the signal-to-noise ratio for one or more in-cell mobile terminals. Examples of such system include a system employing successive interference cancellation or an OFDMA system that allows only one in-cell transmission over a given set of frequency tones.

The above-described embodiment is illustrative of the principles of the present invention. Those skilled in the art can devise other embodiments without departing from the spirit and scope of the present invention.

The invention claimed is:

1. A method at a base station, the base station being within an active set of base stations with which a mobile terminal in handoff is sending data in a signal, the active set comprising a serving base station and one or more non-serving base stations, the method comprising:
   receiving a received signal at the serving base station from the mobile terminal and carrying out a decoding operation for the received signal;
   sending successfully decoded data decoded at the serving base station, and a transmission format of the received signal, to one or more of the non-serving base stations in the active set, the decoded data and the transmission format being sent via a backhaul network interconnecting the base stations of the active set;
   wherein the transmission format includes a number of retransmissions that were required for the serving base station to successfully decode the data, and the decoded data and the transmission format sent from the serving base station are usable by at least one of the one or more non-serving base stations in the active set to remove, from other signals received at the non-serving base station, interference attributable to transmission of the received signal.

2. The method of claim 1 wherein the transmission format comprises a modulation and coding format of the received signal.

3. A method at a first base station, the base station being a non-serving base station within an active set of base stations with which a mobile terminal in handoff is communicating, the method comprising:
   receiving at the non-serving base station, from a serving base station in the active set, data that was successfully decoded by the serving base station from a received signal received by the serving base station from the mobile terminal, along with a transmission format of the received signal, the decoded data and the transmission format being received via a backhaul network interconnecting the base stations of the active set;
   wherein the transmission format includes a number of retransmissions that were required for the serving base station to successfully decode the data, and the decoded data and the transmission format received from the serving base station are usable by the non-serving base station to remove, from signals received at the non-serving base station, interference attributable to transmission of the received signal.

4. The method of claim 3 wherein the transmission format comprises a modulation and coding format of the signal.

5. The method of claim 3 further comprising:
   reconstructing the signal from the mobile terminal using the data received from the serving base station and the received transmission format; and
   subtracting the reconstructed signal from a composite signal received at the non-serving base station from other mobile terminals.

6. A serving base station within an active set of base stations, the active set of base stations including the serving base station and one or more non-serving base stations, the serving base station comprising:
   a receiver configured to:
      receive a received signal from a mobile terminal;
      decode the received signal to produce decoded data; and
      send the decoded data and a transmission format of the received signal to one or more of the non-serving base stations in the active set, the decoded data and the transmission format being sent via a backhaul network interconnecting the base stations of the active set, the transmission format including a number of retransmissions that were required for the serving base station to successfully decode the data;
      wherein the decoded data and the transmission format are usable by at least one of the one or more non-serving base stations in the active set to remove, from other signals received at the non-serving base station, interference attributable to the received signal.

7. The serving base station of claim 6 wherein the receiver is further configured to determine whether the mobile terminal is in handoff, and if so, sends the decoded data and the transmission format to the one or more non-serving base stations.

8. The serving base station of claim 6 wherein the transmission format further includes a modulation and coding format of the received signal.

9. A non-serving base station within an active set of base stations, the non-serving base station comprising:
   a receiver configured to:
      receive, from a serving base station in the active set, data that was successfully decoded by the serving base station from a received signal received by the serving base station from a mobile terminal, along with a transmission format of the received signal, the decoded data and transmission format being received via a backhaul network interconnecting the base stations of the active set, the transmission format including a number of retransmissions that were required for the serving base station to successfully decode the data; and remove, from other signals received at the non-serving base station, interference attributable to transmission of the received signal using the decoded data and the transmission format.

10. The non-serving base station of claim 9 wherein the transmission format comprises a modulation and coding format of the received signal.

11. The non-serving base station of claim 9 wherein the receiver is further configured to:
reconstruct the received signal from the mobile terminal using the decoded data and the transmission format; and
subtract the reconstructed signal from a composite signal including the received signal and the other signals.

* * * * *